April 9, 1963 H. E. LINDEN 3,084,750
RENEWABLE CUTTING EDGE FOR PLOWSHARES
Original Filed Aug. 2, 1955 2 Sheets-Sheet 1
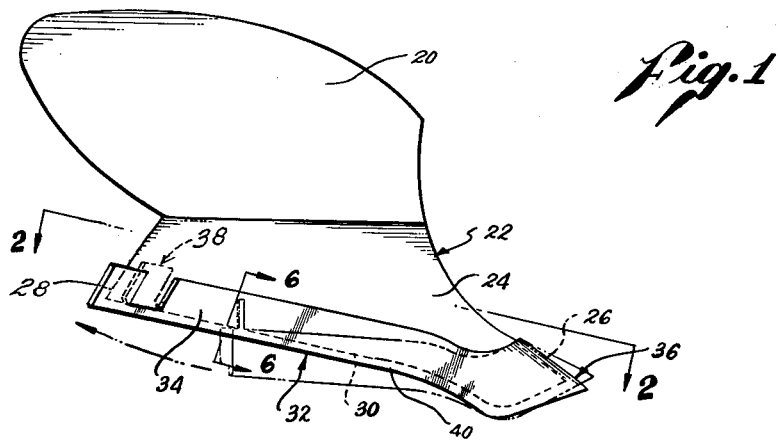
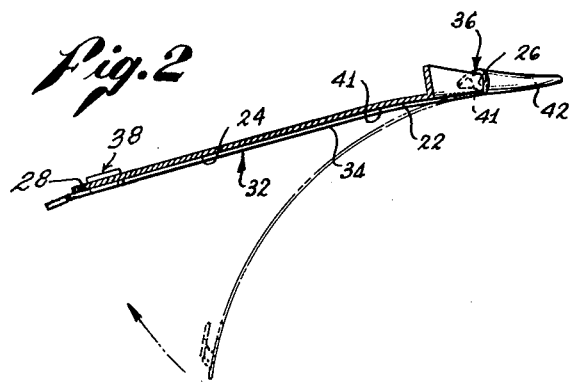
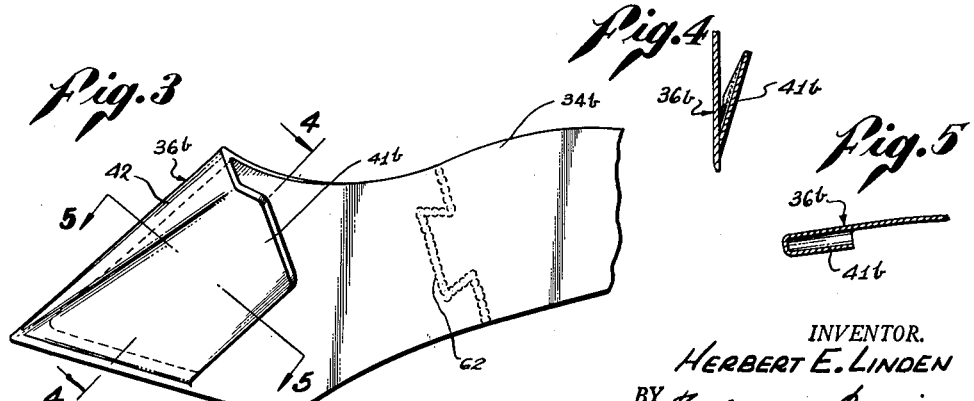
INVENTOR.
HERBERT E. LINDEN
BY Fulwider & Mattingly
Attorneys

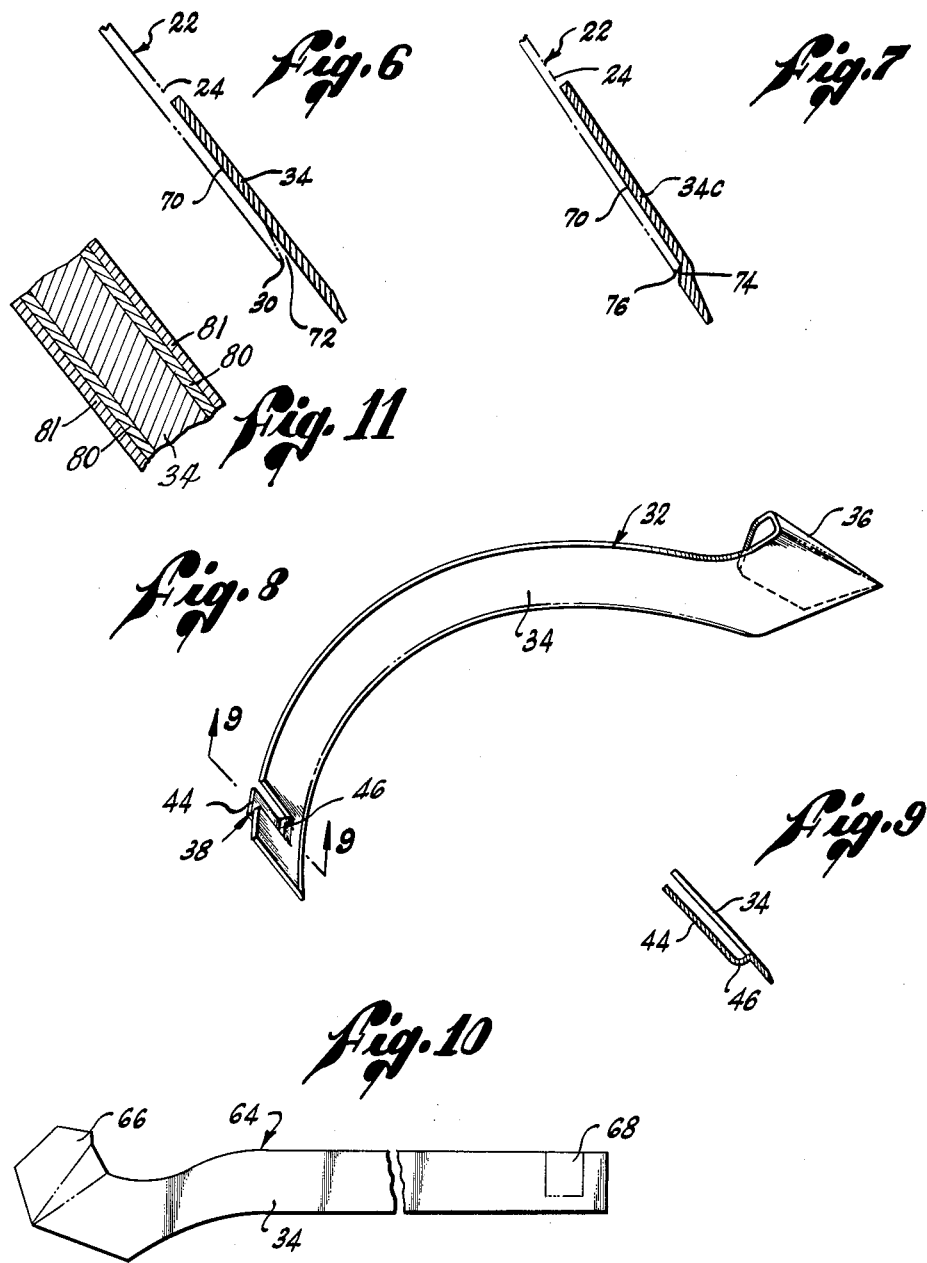

United States Patent Office 3,084,750
Patented Apr. 9, 1963

3,084,750
RENEWABLE CUTTING EDGE FOR PLOWSHARES
Herbert E. Linden, Beverly Hills, Calif.; Herbert E. H. Linden, administrator of said Herbert E. Linden, deceased
Continuation of abandoned application Ser. No. 526,052, Aug. 2, 1955. This application Mar. 23, 1961, Ser. No. 98,284
5 Claims. (Cl. 172—719)

This is a continuation of application Serial No. 526,052 filed by me August 2, 1955, now abandoned, which in turn is a continuation-in-part of application Serial No. 247,822 filed by me September 22, 1951, and now abandoned.

The present invention relates generally to renewable cutting edges for agricultural and earth-working implements and more particularly to an improved renewable cutting edge for plowshares.

Conventional plows usually include a chassis arranged to be propelled by suitable means, a moldboard secured to the chassis, and a plowshare of considerable width ordinarily attached to the moldboard by suitable fastening means, such as nuts and bolts. The plowshares are quite expensive because of the necessity of forming them of a metal having long-wearing qualities and because of their size and peculiar shape, which shape must be such that the cutting edge of the plowshare will have a low friction in passing through earth. Ordinarily it is only the point and cutting edge of the plowshare which is worn away in use, and when this occurs, the user is required to remove the entire plowshare from the moldboard and take it, at considerable expense and vexatious delay, to be resharpened. In order to avoid such expense and delay there have been heretofore proposed several types of renewable cutting edges which may be applied to the face of the plowshare so as to fit over the original cutting edge.

The majority, but not all, of these heretofore-proposed renewable cutting edges have been adapted for use with plowshares of standard construction and have proved to be reasonably satisfactory in use. It has been found, however, that these renewable cutting edges have been quite expensive whereby the margin of difference between resharpening the original cutting edge of the plowshare and purchasing a renewable cutting edge is not very outstanding. This small expense margin when combined with the added weight of the heretofore-proposed renewable cutting edges has proved to be a considerable deterrent to wide acceptance of these devices. The chief cause of the comparatively high cost of these devices arises from the difficulty of rigidly securing them to the face of the plowshares, which difficulty is due to the fact that the face of the conventional plowshare is formed with a concave longitudinal curvature. In order to make the renewable cutting edge conform to this concave curvature, it is customary to form them with a plurality of upstanding fingers rigidly secured at their lower ends along the length of the blade of the renewable cutting edge. The renewable cutting edge is secured to the plowshare by forcing these attachment fingers away from the rear of the blade of the cutting edge and slipping this blade over the lower edge of the plowshare. Thereafter these fingers will exert a frictional pressure between the plowshare and the rear blade. These attachment fingers not only contribute appreciably to the cost of the conventional renewable cutting edge, but they also contribute to a considerable extent to the weight thereof. Additionally, these fingers do not always provide a sufficiently rigid engagement of the renewable cutting edge with the face of the plowshare, especially where the plow is utilized to work heavy soils.

It is a major object of my present invention to provide a renewable cutting edge for plowshares which is very economical of construction and light in weight as compared to existing cutting edges of this type. These improvements are due primarily to my provision of novel means for attaching the renewable cutting edge to a plowshare, which means eliminate the need of attachment fingers or any like devices along the length of the blade of the renewable cutting edge.

It is another object of this invention to provide a renewable cutting edge for plowshares having novel means for attaching the blade thereof to a plowshare, which means is capable of effecting rigid engagement of the blade of the renewable cutting edge with the face of the plowshare under even the most adverse working conditions.

A further object of the present invention is to provide a renewable cutting edge for plowshares which is readily installed upon and removed from a plowshare without requiring the use of any special tools.

It is yet another object of the present invention to provide a renewable cutting edge for plowshares which will fit a standard plowshare without necessitating any alteration thereof.

Another advantage of the preferred form of renewable plowshare edge embodying my present invention is its improved resistance to wear over heretofore-proposed renewable edges. Such wear resistance is obtained by means of a unique dipping process.

It is an important object of this invention to provide a renewable cutting edge for plowshares having means for restraining the entrance of soil between the rear of the blade of the cutting edge and the face of the plowshare. This feature is of considerable advantage inasmuch as it often occurs when conventional renewable cutting edges are utilized to work certain fine soils, especially of the sandy type, soil will gradually work its way between the back surface of the blade of the cutting edge and the face of the plowshare so as to force the blade away from the face. When this happens the renewable cutting edge no longer has the same configuration as the face of the plowshare and the friction of the cutting edge as it passes through earth will be increased. It may also occur that this building up of soil between the plowshare and the renewable cutting edge will result in disengagement of the renewable cutting edge from the plowshare.

Another object of the present invention is to provide a renewable cutting edge for plowshares having means for maintaining its blade tightly against the face of the plowshare whereby it will retain substantially the same longitudinal configuration thereof.

An additional object of this invention is to provide a renewable cutting edge for plowshares which may be entirely formed from a single metallic blank.

It is yet another object of the present invention to provide a renewable cutting edge for plowshares which, although capable of providing all of the aforementioned features, is of extremely simple and sturdy construction.

Other objects and advantages will become apparent from the following detailed description, taken in conjunction with the accompanying drawings, wherein:

FIGURE 1 is a side elevational view of a conventional plowshare to which is attached a preferred form of renewable cutting edge embodying the present invention;

FIGURE 2 is a generally horizontal view taken on line 2—2 of FIGURE 1;

FIGURE 3 is an enlarged fragmentary view of a detail of construction of a renewable cutting edge embodying the present invention;

FIGURE 4 is a sectional view taken on line 4—4 of FIGURE 3;

FIGURE 5 is a sectional view taken on line 5—5 of FIGURE 3;

FIGURES 6 and 7 are enlarged vertical sectional views taken on line 6—6 of FIGURE 1 and showing alternate shapes which may be assumed by the blade of a renewable cutting edge formed in accordance with the present invention;

FIGURE 8 is a perspective view of the renewable cutting edge shown in FIGURES 1 and 2;

FIGURE 9 is an enlarged sectional view taken on line 9—9 of FIGURE 8; and

FIGURE 10 is a broken plan view of a metallic blank from which may be formed an alternate form of cutting edge embodying the present invention.

FIGURE 11 is a greatly enlarged fragmentary vertical sectional view similar to FIGURE 6 showing a modified form of cutting edge embodying the present invention.

Referring to the accompanying drawings, and particularly to FIGURE 1 thereof, there is shown the moldboard 20 of a conventional plow with a plowshare, generally designated 22, secured thereto. The plowshare 22 is formed with a landside or face 24, a point 26, a heel 28 and a cutting edge 30. When this original cutting edge 30 becomes dull or damaged, a renewable cutting edge, generally designated 32, formed in accordance with the present invention may be affixed to the lower portion of the plowshare, as indicated in FIGURES 1 and 2. Preferably, this renewable cutting edge 32 broadly comprises an elongated blade 34, a front pocket, generally designated 36, adapted to be fitted over the point 26, and a rear clamp, generally designated 38, adapted to be fitted over the heel 28. The profie of the blade 34 is seen to closely follow the profile of the plowshare 22, being curved downwardly at its front portion to correspond to the peculiar shape of the plowshare at this point with the bottom 40 of the new cutting edge approximating closely the line of the original cutting edge 30.

With particular reference to FIGURE 2, it will be observed that the face 24 of the plowshare 22 is formed with a concave longitudinal curvature 41. It is an important feature of the present invention that the blade 34 of the renewable cutting edge 32 may be caused to assume and retain this curvature without the use of the heavy and expensive attachment fingers found on the ordinary cutting edge. In order to eliminate such attachment fingers, the blade 34 is not straight, as is the case with conventional renewable cutting edges, but instead it is formed with a normal concave longitudinal curvature greater than the curvature of the plowshare as indicated by the dotted lines in FIGURE, i.e. having a radius of curvature less than that of the plowshare face. By virtue of this longitudinal curvature, once the front and rear ends of the renewable cutting edge 32 are secured to the point and heel of the plowshare, the blade 34 will be fixed or sprung tightly against the face 24. As shown in FIGURE 2, the normal longitudinal curvature of the blade in its relaxed condition will be such that when the front pocket 36 is engaged with the point 26 the major portion of the blade 34 tends to curve away from the face 24 with the rear of the blade being disposed most remotely therefrom. It is important, however, that the curvature starts near the front of the blade in order to obtain best results, since if it starts farther to the rear the blade will not always fit tightly against the face.

Referring again to FIGURES 1 and 2, in order to install the renewable cutting edge 32 upon the plowshare 22, the front pocket 36 is first slipped over the point 26 thereof. At this time the renewable cutting edge is disposed approximately as indicated by the lightly dotted outline in these figures with the upper edge of the rear portion thereof being spaced somewhat below the heel 28. Next, the rear of the renewable cutting edge is moved upwardly, and also inwardly toward the heel 28 in a direction which is indicated by the arrow in FIGURE 1, until the rear clamp 38 encompasses the heel. As soon as this movement has been accomplished, the renewable cutting edge 32 will be held firmly in place.

The front pocket 36 may be readily formed from the same piece of material as the blade by bending the forward portion of the blade back upon itself so as to form a side wall 41b, as shown in FIGURE 3. The forward edge 42 of this pocket will preferably be shaped in conformity with the lower portion of the plowshare point 26. When the front pocket is fitted over this point, the latter is adapted to snugly seat therewithin until such time as it becomes desirable to remove the renewable cutting edge 32 from the plowshare. At this time the rear of the renewable cutting edge 32 must be lowered in a reversal of the installation procedure described previously above. It should be observed that it is possible to form the front pocket 36 by a separate casting operation rather than from the material of the blade.

The rear clamp 38 will preferably be formed from the same piece of material as the blade 34. As shown in FIGURES 8 and 9, it may consist of an upstanding side wall 44 and a bottom wall 46 which are both struck out of the rear portion of the blade 34.

Referring again to FIGURE 3, it is commonly known that a metal which has high wear resistance is generally quite difficult to form into various shapes. Thus, if the blade is made from a metal which is sufficiently ductile to permit it to be formed into a front pocket and a rear clamp, it may not possess sufficient wear resistance for use under all operating conditions. Of course this defect may be cured by the application of a hard facing material, such as tungsten carbide or the like, to the lower cutting portion thereof, however, the cost of this procedure may be quite high. Hence, I have found it desirable to form the blade of a metal having a high wear resistance and forming the front pocket separately therefrom. The front pocket may then be rigidly affixed, as by welding, to the front end of this blade. As noted hereinabove the front pocket may be of cast construction utilizing a metal which also has a high wear resistance, such as manganese steel. As shown in FIGURE 3, this front pocket 36b may be welded to the front edge of the blade 34b as by a tension weld 62.

It is an important feature of the present invention that should it be decided to form the entire renewable cutting edge from a single piece of material the operation may be performed in a single operation. Thus, referring to FIGURE 10, a blank, generally designated 64, may be stamped or otherwise cut out which includes an elongated blade portion 34, a front portion 66 which may be folded over so as to form a front pocket, and a rear portion 68 which may be struck out so as to form a rear clamp. This blank may be inserted within a suitable forming press so as to simultaneously form the front pocket and rear clamp. The normal concave longitudinal curvature shown in FIGURES 2 and 8 may be readily formed when stamping out the blank 64.

It will be readily apparent that a steel having sufficient flexibility to resiliently retain the necessary longitudinal curvature of the blade 34 may not possess adequate resistance to wear. In order to overcome this disadvantage, I aluminize the renewable cutting edge 32 in a special manner. Thus, the renewable cutting edge 32 is first cleaned and pickled and then immersed in a molten layer of salt existing at approximately 1550° F. A layer of molten aluminum is disposed above the molten salt layer. After the renewable cutting edge 32 has been heated to a desired temperature by the molten salt it is raised through the molten aluminum layer. As the cutting edge 32 passes through and out of the molten aluminum it receives a coating thereof. After being removed from the molten aluminum the cutting edge 32 is quenched in oil. Thereafter, it is drawn for about 3 to 4 minutes at approximately 800° F. so as to be stress relieved.

The above described process acts as a combination heat treating and aluminum coating process for the renewable cutting edge 32. The aluminum coating process eliminates a separate painting operation and provides the renewable cutting edge 32 with excellent corrosion resistance qualities. The intermetallic aluminum-steel compound is very hard (approximately 48-50 Rockwell C) so as to provide the blade of the renewable cutting edge with adequate wear resistance even under adverse working conditions. Such wear resistance will approximate that of the plowshare. At the same time the blade retains sufficient resiliency for retaining the necessary longitudinal curvature required to insure its self-retention on the plowshare. A greatly enlarged vertical section of the aluminized cutting edge 32 is shown in FIGURE 11, the aluminum coating being indicated by the numeral 80, and the aluminum-metallic interlayer being indicated by the numeral 81.

Another important advantage afforded by the present invention is that of novel means for restraining the entrance of soil between the back surface of the blade of a renewable cutting edge and the face of the plowshare whereon it is mounted. Thus, referring to FIGURE 6, there is shown a vertical sectional view of the blade 34 of one form of the renewable cutting edge 32 of FIGURE 1. It will be seen that the back surface 70 of this blade 34 rests against the face 24 of the plowshare 22. It will be apparent that unless the blade 34 is urged very tightly against the face 24, it will be possible for certain fine soils, especially of the sandy type, to be forced through the space 72 upwards between the blade and the face. As mentioned previously, hereinbefore, any build-up of soil between the blade and the face of the plowshare is detrimental to the effective operation of the plow and may also result in eventual disengagement of the renewable cutting edge from the plowshare. Accordingly, in an effort to prevent such occurrence, it has been found desirable to transversely offset the lower portion of the blade 34c as shown in FIGURE 7 at 74, whereby this lower portion covers the original cutting edge of the plowshare 22. By this arrangement the entrance of soil between the blade 34c and the face 24 of the plowshare is effectively restrained. In order to provide a more effective seal the original cutting edge of the plowshare may be rounded off as indicated at 76 of this figure.

As stated above, a renewable cutting edge formed in accordance with the foregoing description will closely conform to the configuration of the original plowshare. For this reason the original line of draft of the plowshare will not be adversely affected. Hence, there will not be required the application of an appreciable amount of additional power in order to compensate for the use of my renewable cutting edge, as has been true of certain heretofore-proposed renewable cutting edges. Also, it should be observed that a cutting edge built in accordance with the present invention does not incorporate any protuberances along the length of its blade liable to interrupt the free flow of soil therealong as the plowshare is moved through the earth. Hence, the friction developed by a plowshare mounting a renewable cutting edge of this type will not be substantially greater than the friction developed by the bare plowshare alone.

Despite the lack of friction-causing protuberances along the length of my blade it will remain firmly affixed to the plowshare, the engagement of the front pocket 36 with the plowshare's point 26 resisting all tendency of the earth to dislodge the renewable cutting edge rearwardly during a plowing operation.

It will be apparent to those skilled in the art that various modifications and changes may be made without departing from the spirit of the invention or the scope of the appended claims.

I claim:

1. A renewable cutting edge for a plowshare comprising a flexible, resilient, elongated blade having a substantial width in relation to its thickness and a sharpened edge, a front pocket formed at the forward end of said blade for receiving the point of the plowshare, and a rear clamp formed at the rear portion of said blade for receiving the heel of the plowshare, said front pocket and rear clamp cooperating with the point and heel of the plowshare to secure the forward and rear ends of the blade against transverse movement relative to the plowshare with the inner face of said blade against the outer face of the plowshare and said sharpened edge extending beyond the original cutting edge of the plowshare, said front pocket also cooperating with said point to restrain said blade against rearward longitudinal movement relative to the plowshare during forward movement of the latter through the soil, said blade having a long substantially smooth and continuous intermediate portion between said front pocket and said rear clamp to provide an overall cutting profile closely approximating the original cutting edge of the plowshare with which it is used, said intermediate portion of said blade having a normal curvature in a direction normal to the plane of said blade to provide a normally convex rear face, said curvature commencing near said forward end and being substantially greater than the curvature of the outer face of the plowshare to urge the rear face of said intermediate portion by spring action into snug continuous engagement throughout its length with the outer face of the plowshare when said front pocket and rear clamp are engaged with the plowshare so as to restrain the entrance of soil between the rear face of said blade and the front face of the plowshare, said blade being free of positive connection to the plowshare between said front pocket and rear clamp so that said intermediate portion is restrained against movement away from the plowshare solely by said spring action.

2. A renewable cutting edge as recited in claim 1 wherein the lower portion of said blade is offset rearwardly to cover the original cutting edge of the plowshare and extends downwardly from said offset substantially in the plane of the plowshare.

3. A renewable cutting edge as recited in claim 1 wherein said front pocket is welded to the forward end of said intermediate portion of said blade.

4. A renewable cutting edge as recited in claim 1 wherein said front pocket and said rear clamp are integral with said blade.

5. A renewable cutting edge as recited in claim 4 wherein said rear clamp is struck out from said blade.

References Cited in the file of this patent

UNITED STATES PATENTS

| | | |
|---|---|---|
| 187,659 | McIntyre | Feb. 20, 1877 |
| 1,925,779 | Tomlinson | Sept. 5, 1933 |
| 2,073,801 | Linden | Mar. 16, 1937 |
| 2,508,542 | Sacksteder | May 23, 1950 |